(12) United States Patent
Kashiwagi

(10) Patent No.: US 6,376,603 B1
(45) Date of Patent: Apr. 23, 2002

(54) TITANIUM OXIDE-FILLED ADDITION REACTION-CURABLE SILICONE RUBBER COMPOSITION

(75) Inventor: Tsutomu Kashiwagi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/714,613

(22) Filed: Nov. 17, 2000

(30) Foreign Application Priority Data

Nov. 17, 1999 (JP) .......................................... 11-327374

(51) Int. Cl.$^7$ ................................................. C08K 3/22
(52) U.S. Cl. ........................ 524/847; 528/15; 528/31; 528/32; 523/200; 427/219; 524/497
(58) Field of Search ............................... 528/15, 31, 32; 523/200; 427/219; 524/497, 847

(56) References Cited

U.S. PATENT DOCUMENTS 5,982,041 A * 11/1999 Mitani et al.
6,069,201 A 5/2000 Okinoshima et al.

* cited by examiner

Primary Examiner—Philip Tucker
Assistant Examiner—Kuo-Liang Peng
(74) Attorney, Agent, or Firm—Pillsbury Winthrop LLP

(57) ABSTRACT

A titanium oxide-filled addition reaction-curable silicone rubber composition including (A) a diorganopolysiloxane containing at least two alkenyl groups in one molecule, (B) an organohydrogenpolysiloxane containing in one molecule at least two silicon-bonded hydrogen atoms, (C) a platinum group metal catalyst, and (D) a titanium oxide powder having been surface-treated with a compound selected from the group consisting of a tetraalkoxysilane and a partial hydrolysis-condensation product of a tetraalkoxysilane; the titanium oxide powder being contained in an amount not less than 15 parts by weight based on 100 parts by weight of the component (A). The composition has a low viscosity and low thixotropic properties and easy to handle, even though it contains titanium oxide in a large quantity, and especially has a superior operability when used as a light-screening agent or a reflecting agent.

17 Claims, No Drawings

TITANIUM OXIDE-FILLED ADDITION REACTION-CURABLE SILICONE RUBBER COMPOSITION

BACKGROUND OF THE INVENTION

1. Field of the Invention

This invention relates to a titanium oxide-filled addition reaction-curable silicone rubber composition having a low viscosity and low thixotropic properties.

2. Description of the Prior Art

Titanium oxide is conventionally added in silicone compositions as a colorant. As its new uses, e.g., there is a demand for uses as a light-screening agent in thin films or conversely as a reflecting agent. Stated specifically, there is a demand for its use in parallel type reflecting agents of photocoupler devices and reflective undercoatings of LEDs.

To meet such a demand, it is necessary to add the titanium oxide in a large quantity. However, adding titanium oxide in a silicone rubber composition in a large quantity as conventionally done makes the composition have a high viscosity and high thixotropic properties to make it difficult to handle and also provide no satisfactory operability.

SUMMARY OF THE INVENTION

Accordingly, an object of the present invention is to provide a titanium oxide-filled addition reaction-curable silicone rubber composition having a low viscosity and low thixotropic properties and easy to handle, even though it contains titanium oxide in a large quantity, and especially having a superior operability when used as a light-screening agent or a reflecting agent.

To achieve the above object, the present invention provides a titanium oxide-filled addition reaction-curable silicone rubber composition comprising;

(A) a diorganopolysiloxane containing at least two alkenyl groups in one molecule;

(B) an organohydrogenpolysiloxane containing in one molecule at least two hydrogen atoms bonded to silicon atoms;

(C) a platinum group metal catalyst; and (D) a titanium oxide powder having been surface-treated with a compound selected from the group consisting of a tetraalkoxysilane and a partial hydrolysis-condensation product of a tetraalkoxysilane; the titanium oxide powder being contained in an amount not less than 15 parts by weight based on 100 parts by weight of the component (A).

The present invention also provides a cured product obtained by curing the above composition.

DESCRIPTION OF THE PREFERRED EMBODIMENTS

The present invention will be described below in detail.

(A) Alkenyl Group-containing Diorganopolysiloxane:

The component-(A) diorganopolysiloxane is a compound containing at least two alkenyl groups in one molecule, and is used as a base polymer of the composition of the present invention. This alkenyl group-containing diorganopolysiloxane is normally a substantially linear (or straight-chain) compound whose backbone chain moiety consists basically of repetition of diorganopolysiloxane units and both molecular-chain terminals are terminated with triorganopolysiloxyl groups. It may also contain a branched structure at some parts of its molecular structure, or may have a cyclic structure on the whole. In particular, in view of physical properties such as mechanical strength of cured products, straight-chain diorganopolysiloxanes are preferred. The alkenyl group may be present only on the both terminals of the molecular chain, may be present only in the course of the molecular chain as side-chain substituents, or may be present both on the both terminals of the molecular chain and in the course of the molecular chain.

As typical examples of such an alkenyl group-containing diorganopolysiloxane, it may include diorganopolysiloxanes represented by the following general formula (1):

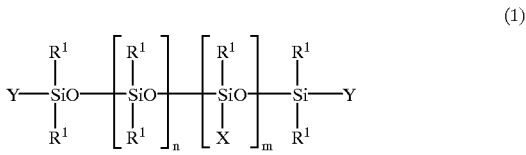

(1)

wherein $R^1$'s each independently represent a substituted or unsubstituted monovalent hydrocarbon group containing no aliphatic unsaturated bond, X represents an alkenyl group, Y's each represent an alkenyl group or a group represented by $R^1$, n is an integer of 0 or 1 or more, and m is an integer of 0 or 1 or more; having in the molecule at least two alkenyl groups bonded to silicon atoms.

In the general formula (1), the substituted or unsubstituted monovalent hydrocarbon group containing no aliphatic unsaturated bond, represented by $R^1$ may include, e.g., alkyl groups such as a methyl group, a ethyl group, a propyl group, a isopropyl group, a butyl group, a isobutyl group, a tert-butyl group, a pentyl group, a neopentyl group, a hexyl group, a heptyl group, a octyl group, a nonyl group, a decyl group and a dodecyl group; cycloalkyl groups such as a cyclopentyl group, a cyclohexyl group and a cycloheptyl group; aryl groups such as a phenyl group, a tolyl group, a xylyl group, a naphthyl group and a biphenyl group; aralkyl groups such as a benzyl group, a phenylethyl group, a phenylpropyl group and a methylbenzyl group; and any of these groups at least part of hydrogen atoms bonded to carbon atoms of which has been substituted with a halogen atom such as fluorine, chlorine or bromine or a cyano group, as exemplified by halogen-substituted alkyl groups, cyano-substituted alkyl groups and halogen-substituted aryl groups such as a chloromethyl group, a 2-bromomethyl group, a 3-chloropropyl group, a 3,3,3-trifluoropropyl group, a chlorophenyl group, a fluorophenyl group, a cyanoethyl group, a 3,3,4,4,5,5,6,6,6-nonafluorohexyl group. Typical groups represented by $R^1$ are those having 1 to 10 carbon atoms, in particular, those having 1 to 6 carbon atoms, and preferably substituted or unsubstituted alkyl groups having 1 to 3 carbon atoms, such as a methyl group, an ethyl group, a propyl group, a chloromethyl group, a bromoethyl group, a 3,3,3-trifluorpropyl group and a cyanoethyl group; and substituted or unsubstituted phenyl groups such as a phenyl group, a chlorophenyl group and a fluorophenyl group.

In the general formula (1), the alkenyl group represented by X may usually include those having 2 to 8 carbon atoms as exemplified by a vinyl group, an allyl group, a propenyl group, a isopropenyl group, a butenyl group, a hexenyl group and a cyclohexenyl group. In particular, lower alkenyl groups such as a vinyl group and an allyl group are preferred.

In the general formula (1), n is an integer of 0 or more, and m is an integer of 0 or more. Also, n and m may preferably be integers that satisfy $10 \leq n+m \leq 10,000$ and $0 \leq m/(m+n) \leq 0.2$, and particularly preferably integers that satisfy $50 \leq n+m \leq 2,000$ and $0 \leq m/(m+n) \leq 0.05$. Y's each represent an alkenyl group or the group represented by $R^1$. This alkenyl group may include the same as those exemplified for those of X, and $R^1$ is as defined above, provided that Y's as substituents bonded to silicon atoms at the molecular-chain both terminals may both preferably be alkenyl groups.

This alkenyl group-containing diorganopolysiloxane may also preferably be those having a viscosity at 25° C. of from 1 to 100,000 poises, and particularly from about 10 to 50,000 poises.

(B) Organohydrogenpolysiloxane:

The component-(B) is a compound having in one molecule at least two, and preferably at least three, hydrogen atoms bonded to silicon atoms (i.e., SiH groups), and is used as a cross-linking agent (D). This organohydrogenpolysiloxane may be any of resinous products having a straight-chain, branched, cyclic or three-dimensional network structure. As typical examples of such an organohydrogenpolysiloxane, it may include, e.g., organohydrogenpolysiloxanes represented by the following average compositional formula (2):

wherein $R^2$ independently represents a substituted or unsubstituted monovalent hydrocarbon group containing no aliphatic unsaturated bond; and a and b are numbers that satisfy $0<a<2$, $0.7 \leq b \leq 2$ and $0.8 \leq a+b \leq 3$, and preferably $0.001 \leq a \leq 1.2$, $0.8 \leq b \leq 2$ and $1 \leq a+b \leq 2.7$, and more preferably $0.01 \leq a \leq 1$, $1.2 \leq b \leq 2$ and $1.8 \leq a+b \leq 2.4$.

In the average compositional formula (2), the substituted or unsubstituted monovalent hydrocarbon group containing no aliphatic unsaturated bond, represented by $R^2$ may include the same as those exemplified for $R^1$ in the general formula (1). Typical groups represented by $R^2$ are those having 1 to 10 carbon atoms, in particular, those having 1 to 7 carbon atoms, and may preferably be lower alkyl groups having 1 to 3 carbon atoms, such as a methyl group; a phenyl group; and a 3,3,3-trifluoropropyl group.

Such organohydrogenpolysiloxanes may specifically include, e.g., siloxane oligomers such as 1,1,3,3-tetramethyldisiloxane, 1,3,5,7-tetramethyltetracyclosiloxane and 1,3,5,7,8-pentamethylpentacyclosiloxane; siloxane polymers such as methylhydrogenpolysiloxanes terminated with trimethylsiloxyl groups at both terminals of the molecular chain, dimethylsiloxane-methylhydrogensiloxane copolymers terminated with trimethylsiloxyl groups at both terminals of the molecular chain, methylhydrogenpolysiloxanes terminated with silanol groups at both terminals of the molecular chain, dimethylsiloxane-methylhydrogensiloxane copolymers terminated with silanol groups at both terminals of the molecular chain, dimethylpolysiloxanes terminated with dimethylhydrogensiloxyl groups at both terminals of the molecular chain, methylhydrogenpolysiloxanes terminated with dimethylhydrogensiloxyl groups at both terminals of the molecular chain, dimethylsiloxane-methylhydrogensiloxane copolymers terminated with dimethylhydrogensiloxyl groups at both terminals of the molecular chain, dimethylsiloxane-diphenylsiloxane-methylhydrogensiloxane copolymers terminated with trimethylsiloxyl groups at both terminals of the molecular chain, and dimethylsiloxane-diphenylsiloxane-methylhydrogensiloxane copolymers terminated with trimethylhydrogensiloxyl groups at both terminals of the molecular chain; and silicone resins which consist of an $R^2(H)SiO_{1/2}$ unit and an $SiO_{4/2}$ unit and may optionally contain an $R_3SiO_{1/2}$ unit, an $R_2SiO_{2/2}$ unit, an $R(H)SiO_{2/2}$ unit, an $(H)SiO_{3/2}$ unit or an $RSiO_{3/2}$ unit (in the formulas, R's are the same as those for the substituted or unsubstituted monovalent hydrocarbon group exemplified as $R^1$). They may further include those represented by the following formulas:

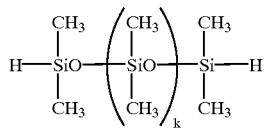

(k is an integer of 1 to 200.)

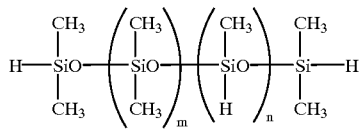

(m is an integer of 0 to 100, and n is an integer of 1 to 100.)

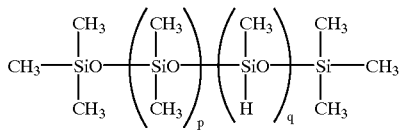

(p is an integer of 0 to 100, and q is an integer of 2 to 100, and preferably an integer of 3 to 100.)

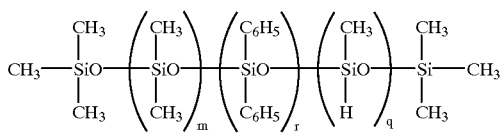

(m and q are as defined above, and r is an integer of 1 to 50.)

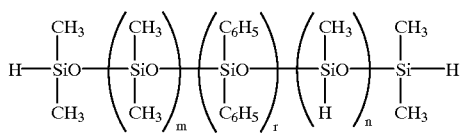

(m, n and r are as defined above.)

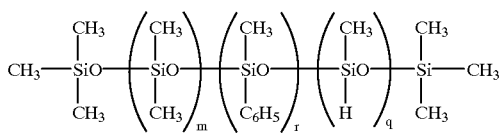

(m, q and r are as defined above.)

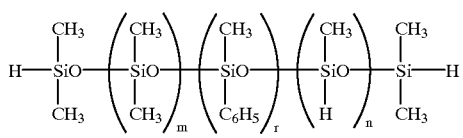

(m, n and r are as defined above.)

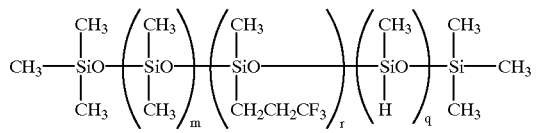

(m, q and r are as defined above.)

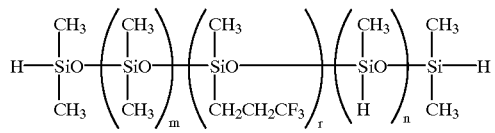

(m, n and r are as defined above.)

As this component-(B) organohydrogenpolysiloxane, those having a viscosity at 25° C. of usually from 0.002 to 10 poises, and particularly from 0.005 to 5 poises, may be used.

The component-(B) organohydrogenpolysiloxane can be produced by any known processes. It may be produced by, e.g., co-hydrolysis of at least one chlorosilane selected from the group consisting of those represented by the following general formulas (3) and (4):

$$R^2SiHCl_2 \qquad (3)$$

$$R^2{}_2SiHCl \qquad (4)$$

wherein $R^2$ is as defined in the average compositional formula (2); or an alkoxyl derivative thereof (e.g., a methoxyl derivative), or co-hydrolysis of this chlorosilane or alkoxyl derivative thereof (e.g., a methoxyl derivative) together with at least one chlorosilane selected from the group consisting of those represented by the following general formulas (5) and (6):

$$R^2{}_3SiCl \qquad (5)$$

$$R^2{}_2SiCl_2 \qquad (6)$$

wherein $R^2$ is as defined in the average compositional formula (2). The organohydrogenpolysiloxane may also be produced by subjecting to equilibrium reaction the polysiloxane obtained by hydrolysis carried out in such a way.

The component (B) may be used in such an mount that hydrogen atoms bonded to silicon atoms (i.e., SiH groups) in the component-(B) organohydrogenpolysiloxane are present usually in an amount of from 0.5 to 8 moles, and preferably from 1 to 5 moles, per mole of the alkenyl groups in the component-(A) alkenyl group-containing diorganopolysiloxane.

(C) Platinum Group Metal Catalyst:

The component-(C) platinum group metal catalyst is a catalyst for accelerating the addition reaction (hydrosililation reaction) of the component-(A) alkenyl group-containing diorganopolysiloxane with the SiH groups of the component-(B). As the platinum group metal catalyst, any well known catalysts for hydrosililation reaction may be used. As specific examples thereof, they may include, e.g., platinum group metal simple substances such as platinum (inclusive of platinum black), rhodium and palladium; platinum chloride, chloroplatinic acid and chloroplatinates such as $H_2PtCl_4 \cdot nH_2O$, $H_2PtCl_6 \cdot nH_2O$, $NaHPtCl_6 \cdot nH_2O$, $KHPtCl_6 \cdot nH_2O$, $Na_2PtCl_6 \cdot nH_2O$, $K_2PtCl_4 \cdot nH_2O$, $PtCl_2$ and $Na_2HPtCl_4 \cdot nH_2O$ (wherein n is an integer of 0 to 6, and preferably 0 or 6); alcohol-modified chloroplatinic acid (see U.S. Pat. No. 3,220,972); complexes of chloroplatinic acid with olefins (see U.S. Pat. Nos. 3,159,601, 3,159,662 and 3,775,452); catalysts comprising a platinum group metal such as platinum black or palladium supported on a support such as alumina, silica or carbon; rhodium-olefin complexes; chlorotris(triphenylphosphine)rhodium (a Wilkinson catalyst); and complexes of platinum chloride, chloroplatinic acid or chloroplatinates with vinyl-group-containing siloxanes, in particular, vinyl-group-containing cyclic siloxanes.

The component (C) may be used in what is called a catalytically effective quantity, and may usually be in an mount of from about 0.1 to 1,000 ppm, and particularly from about 0.5 to 500 ppm, in terms of the weight of the platinum group metal, based on the total weight of the components (A) and (B).

(D) Titanium Oxide Powder Having been Surface-treated with Tetraalkoxysilane and/or Partial Hydrolysis-condensation Product of Tetraalkoxysilane:

The component-(D) surface-treated titanium oxide powder is a fine titanium oxide powder having been surface-treated with at least one compound selected from the group consisting of a tetraalkoxysilane and a partial hydrolysis-condensation product of tetraalkoxysilane, and is a component that chiefly colors cured products (in white), endows them with light-screening properties, reflecting properties, heat resistance, mechanical properties and so forth, or reinforces such properties.

(i) Tetraalkoxysilane and/or Partial Hydrolysis-condensation Product of Tetraalkoxysilane:

The tetraalkoxysilane used in the surface treatment of titanium oxide powder is represented by the following general formula (7):

$$Si(OR^3)_4 \qquad (7)$$

wherein $R^3$'s each independently represent a lower alkoxyl-substituted or unsubstituted alkyl group.

In the general formula (7), the lower alkoxyl-substituted or unsubstituted alkyl group represented by $R^3$ may include, e.g., those usually having about 1 to 12 carbon atoms, and preferably about 1 to 6 carbon atoms, such as a methyl group, an ethyl group, a propyl group, an isopropyl group, a butyl group, an isobutyl group, a t-butyl group, a pentyl group, a neopentyl group, a hexyl group, a heptyl group, an octyl group, a nonyl group, a decyl group, a dodecyl group, a methoxymethyl group, a methoxyethyl group, an ethoxymethyl group and an ethoxyethyl group.

Such a partial hydrolysis-condensation product of tetraalkoxysilane may be a siloxane condensation product having at least one, and preferably at least two, residual alkoxyl group(s) in one molecule, and may include those represented by the following average compositional formula (8):

$$[OR^3)_3SiO_{1/2}]_K[OR^3)_2SiO_{2/2}]_L[OR^3)SiO_{3/2}]_M[SiO_{4/2}]_N \qquad (8)$$

wherein $R^3$ is as defined previously; K, L, M and N are numbers that satisfy K+L+M+N=1, $0.002 \leq K \leq 1$, $0 \leq L \leq 0.998$, $0 \leq M \leq 0.998$ and $0 \leq N \leq 0.35$.

In particular, it may typically include those represented by the following general formula (9):

$$R^3O\text{---}[\text{---}Si(OR^3)_2O\text{---}]_j\text{---}R^3 \qquad (9)$$

wherein $R^3$ is as defined previously, and j is an integer of 2 or more, preferably an integer of 2 to 1,000, and more preferably an integer of 2 to 200.

Such a partial hydrolysis-condensation product of tetraalkoxysilane may preferably have a weight-average molecular weight in terms of polystyrene, of from 150 to 100,000, and more preferably from 200 to 20,000.

As a surface-treating agent therefor, one or more types of tetraalkoxysilanes may be used alone, or one or more types of partial hydrolysis-condensation products of tetraalkoxysilane may be used alone. Alternatively, the tetraalkoxysilane and the partial hydrolysis-condensation product of tetraalkoxysilane may be used in combination in any desired proportion.

(ii) Titanium Oxide:

The titanium oxide powder used for the surface treatment may be any of those known in the art. It commonly includes two types, rutile and anatase. Especially when used in light-screening agents or reflecting agents of electronic component parts, those not surface-treated with any aluminum or organic matter are preferred. It may usually have an average particle diameter of from about 0.05 to 10 $\mu$m, and preferably from about 0.1 to 5 $\mu$m, which may appropriately selected in accordance with uses. Incidentally, the average particle diameter may usually be determined as a value of weight-average particle diameter (or median diameter) by, e.g., measurement with an electron microscope or laser light diffraction.

As methods for the surface treatment, any known wet-process treatment or dry-process treatment may be used. As a specific example of surface treatment methods, a method is available in which the tetraalkoxysilane and/or the partial hydrolysis-condensation product of tetraalkoxysilane is/are dissolved or dispersed in a suitable solvent and thereafter the titanium oxide powder is mixed in the resultant solution or dispersion, followed by heating and drying. The solvent may include toluene and xylene. The heating and drying may be carried out, e.g., at 80 to 200° C. for about 0.5 to 10 hours, which may be processed under reduced pressure in combination.

As another surface treatment method, a method is available in which, e.g., at least part (usually 30% by weight or more, and particularly 50% by weight or more) of the alkenyl-group containing diorganopolysiloxane as the component (A), the titanium oxide powder and the tetraalkoxysilane and/or the partial hydrolysis-condensation product of tetraalkoxysilane are mixed and the resultant mixture is heat-treated.

The heat treatment may be made under conditions of, e.g., 80 to 200° C. and about 0.5 to 10 hours. The method in which the surface treatment is made using such a mixture of at least part of the component (A), the titanium oxide powder and the tetraalkoxysilane and/or the partial hydrolysis-condensation product of tetraalkoxysilane is preferred because the titanium oxide powder can be surface-treated simultaneously in the step of mixing or kneading when as described later the components (A) to (D) and optionally other additive components are mixed or kneaded to produce the composition of the present invention and hence the rationalization attributable to energy saving and a shorter process time can be achieved.

The tetraalkoxysilane and/or the partial hydrolysis-condensation product of tetraalkoxysilane may be used in an amount appropriately adjusted in accordance with specific surface area and other properties of the titanium oxide powder, and may usually be in an amount of from 0.1 to 20 parts by weight, and preferably from 0.5 to 10 parts by weight, based on 100 parts by weight of the titanium oxide powder. As a result of such surface treatment, films of siloxane are formed on the particle surfaces of the titanium oxide powder, so that its wettability (or affinity) to silicone resin components is improved and a composition having a low viscosity and low thixotropic properties and rich in fluidity can be obtained.

The component-(D) surface-treated titanium oxide powder may usually be in an amount of 15 parts by weight or more, preferably from 15 to 300 parts by weight, more preferably from 20 to 250 parts by weight, and particularly preferably from 30 to 200 parts by weight, based on 100 parts by weight of the component-(A) alkenyl group-containing diorganopolysiloxane. If it is in a too small amount, the resultant composition may have a low effect on light-screening or reflection.

Other Component:

In addition to the components (A) to (D), any additives usually used may be added to the composition of the present invention. Such additives may include, e.g., reinforcing inorganic fillers such as fumed silica, precipitated silica and fumed titanium dioxide; and non-reinforcing inorganic fillers such as crushed silica, fused silica, crystalline silica (quartz powder), calcium silicate, ferric oxide and carbon black. Any of these inorganic fillers may usually be added in an amount of form 0 to 200 parts by weight based on 100 parts by weight of the total weight of the components (A) to (D).

Especially when the composition is used in a two-pack type as described later, a cure control agent may also be added which includes acetylene alcohol or silane-modified derivatives or siloxane-modified derivatives of acetylene alcohol.

For the purpose of improving adhesion of the composition, an epoxy-group-containing polysiloxane compound or an ester siloxane compound may further be added in addition to the above components.

Silicone Rubber Composition, Production of its Cured Product, and Uses:

The composition of the present invention is produced basically by mixing or kneading the components (A) to (D) and optionally the additive components. In such a case, like conventional addition reaction-curable silicone rubber compositions, the components (A) to (D) may be divided into two parts as exemplified by 'a part of component (A) and the component (D)' and 'the remaining component (A) and the component (B)' to prepare what is called a two-part type composition the two parts of which are mixed and cured when used. Other two-part type composition may include a composition in which at least a part of the component (A), the titanium oxide powder and the tetraalkoxysilane and/or the partial hydrolysis-condensation product of tetraalkoxysilane have been mixed or kneaded when the titanium oxide powder is surface-treated and the resultant mixture or kneaded product has been heat-treated to prepare one part, and the remaining components have been mixed or kneaded to prepare another part. Alternatively, the components (A) to (D) may be mixed or kneaded together with a cure control agent added in a small quantity, to prepare what is called a one-part type composition.

The cured product of the present invention is obtained by curing such a silicone rubber composition. The composition may be cured under conditions like those for known addition reaction-curable silicone rubber compositions. For example, even at room temperature it cures sufficiently. It may optionally be heated.

The cured product of the present invention thus obtained has high light-screening properties and reflecting properties and also has a low viscosity and low thixotropic properties. Accordingly, it can be utilized in coating agents for light-screening and reflection in electric and electronic component parts.

EXAMPLES

The present invention will be described below in greater detail by giving Examples. The present invention should by no means be construed limitative by these Examples.

Example 1

100 parts by weight of a vinyl-group-containing straight-chain dimethylpolysiloxane represented by the following formula:

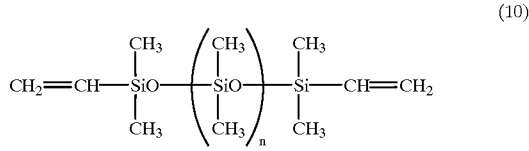

(10)

wherein n is a number that provides this siloxane with a viscosity of 1,000 cP (centipoises) at 25° C. 120 parts by weight of a titanium oxide powder with an average particle diameter of 0.15 μm (purity: 98%; available from Ishihara Sangyo Kaisha, Ltd.) and 3 parts by weight of tetraethoxysilane were kneaded by means of a three-roll mill. Thereafter, the kneaded product obtained was further kneaded at 160° C. for 3 hours by means of a planetary mixer. Next, to the resultant kneaded product, 8 parts by weight of methylhydrogenpolysiloxane [content of hydrogen atoms bonded to silicon atoms (SiH groups): 0.7 mole/100 g; molar ratio of SiH groups in the component (B) to the vinyl groups in the component (A): 4.5] and 0.02 part by weight of a solution of an alcohol-modified product of chloroplatinic acid (platinum content in the solution: 2% by weight) were added, followed by stirring to obtain an addition reaction-curable silicone rubber composition. The viscosity (viscosity at 25° C.; the same applies hereinafter) of this composition was measured with a B-type rotary viscometer to find that it was 64 P (poises).

On the composition thus obtained, its flow properties (flow value), rubber physical properties and other properties of cured products, and light transmission properties of thin films were measured in the following way. Results obtained are shown in Table 1.

Flow Properties (flow value):

The composition was weighed on a glass sheet accurately in an amount of 1 g and was left on a horizontal stand together with the glass sheet at room temperature for 30 minutes, which was then heat-cured at 150° C. for 30 minutes. Thereafter, the diameter of the composition was measured with a vernier caliper.

Cured-product's Rubber Physical Properties:

The composition was casted into a mold of 150 mm×100 mm×2 mm, and this was vacuum-deaerated, followed by heating at 150° C. for 4 hours to obtain a sheetlike cured product. On this cured product, rubber physical properties (hardness, tensile strength and elongation) were measured according to JIS K6249. The hardness was measured with a spring type hardness tester durometer, type A.

Electrical Properties of Cured Products:

The composition was casted into a mold of 150 mm×100 mm×1 mm, and this was vacuum-deaerated, followed by heating at 150° C. for 4 hours to obtain a sheetlike cured product. On this cured product, volume resistivity was measured according to JIS K6249.

Heat Resistance of Cured Products:

Hardness of the same sheetlike cured product as that used in the measurement of the rubber physical properties after it has been heated at 250° C. for 24 hours and hardness after it has been heated at the like temperature for 48 hours were measured according to JIS K6249 (measured with a spring type hardness tester durometer, type A).

Adhesion of Cured Products:

The composition was casted over a nickel substrate, an aluminum substrate and a silicon substrate of 150 mm×100 mm×1 m each, used in electric and electronic component parts, and this was vacuum-deaerated, followed by heating at 150° C. for 4 hours to obtain sheetlike cured products. On these cured products, proportion (area ratio) of areas where cohesive failure occurred (broken at a cross section of the cured product) when taken off with a microspatula from the substrate to areas where interfacial failure occurred (broken at adhesion interface between the cured product and the substrate) was observed to evaluate adhesion according to the following criteria.

○: Cohesive failure is in a percentage more than 80%, showing a good adhesion.

Δ: Cohesive failure is in a percentage of from 20 to 80%, showing adhesion.

X: Cohesive failure is in a percentage less than 20%, showing little adhesion (the cured product is easily peelable).

Thin-film's Light-screening Properties (light transmittance):

On a glass sheet coated with a release agent, spacers having various thickness were placed, where the composition was potted and then vacuum deaerated, followed by curing at 150° C. for 4 hours to obtain thin films of 50 μm, 100 μm and 200 μm thick. On these thin films, light transmittance at 800 nm was measured with a spectrophotometer (using air as a reference).

Example 2

An addition reaction-curable silicone rubber composition was obtained in the same manner as in Example 1 except that the tetraethoxysilane was replaced with 2 parts by weight of a partial hydrolysis-condensation product of tetraethoxysilane (SiO$_2$ content: 40% by weight) (trade name: Ethyl Polysilicate 40T; available from Colcoat Co., Ltd.). The viscosity of this composition was measured with a B-type rotary viscometer to find that it was 60 P (poises).

Next, on the composition thus obtained, its various properties were measured in the manner described in Example 1. Results obtained are shown in Table 1.

Example 3

An addition reaction-curable silicone rubber composition was obtained in the same manner as in Example 1 except that the tetraethoxysilane was replaced with 2 parts by weight of a partial hydrolysis-condensation product of tetramethoxysilane (weight-average molecular weight Mw: 788). The viscosity of this composition was measured with a B-type rotary viscometer to find that it was 61 P (poises).

Next, on the composition thus obtained, its various properties were measured in the manner described in Example 1. Results obtained are shown in Table 1.

Example 4

An addition reaction-curable silicone rubber composition was obtained in the same manner as in Example 1 except that the titanium oxide powder was added in a smaller amount of 60 parts by weight. The viscosity of this composition was measured with a B-type rotary viscometer to find that it was 41 P (poises).

Next, on the composition thus obtained, its various properties were measured in the manner described in Example 1. Results obtained are shown in Table 1.

Example 5

An addition reaction-curable silicone rubber composition was obtained in the same manner as in Example 1 except that the titanium oxide powder was added in a smaller amount of 20 parts by weight. The viscosity of this composition was measured with a B-type rotary viscometer to find that it was 25 P (poises).

Next, on the composition thus obtained, its various properties were measured in the manner described in Example 1. Results obtained are shown in Table 1.

Comparative Example 1

An addition reaction-curable silicone rubber composition was obtained in the same manner as in Example 1 except that the tetraethoxysilane was not added. The viscosity of this composition was measured with a B-type rotary viscometer to find that it was 400 P (poises).

Next, on the composition thus obtained, its various properties were measured in the manner described in Example 1. Results obtained are shown in Table 2.

Comparative Example 2

An addition reaction-curable silicone rubber composition was obtained in the same manner as in Example 1 except that the tetraethoxysilane was replaced with 28 parts by weight of a siloxydisilazane compound represented by the following formula:

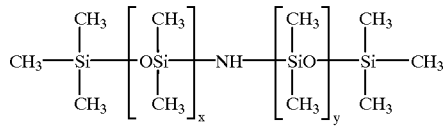

(wherein x and y are numbers that makes the value of x+y=30 as an average value). The viscosity of this composition was measured with a B-type rotary viscometer to find that it was 375 P (poises).

Next, on the composition thus obtained, its various properties were measured in the manner described in Example 1. Results obtained are shown in Table 2.

Comparative Example 3

An addition reaction-curable silicone rubber composition was obtained in the same manner as in Example 1 except that the tetraethoxysilane was replaced with 3 parts by weight of hexamethyldisilazane. The viscosity of this composition was measured with a B-type rotary viscometer to find that it was 280 P (poises).

Next, on the composition thus obtained, its various properties were measured in the manner described in Example 1. Results obtained are shown in Table 2.

Comparative Example 4

An addition reaction-curable silicone rubber composition was obtained in the same manner as in Example 1 except that the titanium oxide powder was added in a smaller amount of 10 parts by weight. The viscosity of this composition was measured with a B-type rotary viscometer to find that it was 37 P (poises).

Next, on the composition thus obtained, its various properties were measured in the manner described in Example 1.

Results obtained are shown in Table 2.

TABLE 1

|  | Example 1 | Example 2 | Example 3 | Example 4 | Example 5 |
|---|---|---|---|---|---|
| Viscosity: (P) | 64 | 60 | 61 | 41 | 25 |
| Flow properties: (mm) | 41 | 42 | 42 | 43 | 50 |
| Hardness (type A): | 47 | 47 | 47 | 40 | 30 |
| Tensile strength: (MPa) | 3.8 | 3.9 | 3.8 | 2.6 | 1.9 |
| Elongation: (%) | 120 | 120 | 120 | 130 | 150 |
| Volume resistivity: (TΩ.m) | 7 | 9 | 8 | 9 | 6 |
| Hardness after 250° C./24 hrs: | 48 | 48 | 48 | 45 | 30 |
| Adhesion: |  |  |  |  |  |
| to Ni | ○ | ○ | ○ | ○ | ○ |
| to Al | ○ | ○ | ○ | ○ | ○ |
| to Si | ○ | ○ | ○ | ○ | ○ |
| Light transmittance (800 nm): (%) |  |  |  |  |  |
| Thickness: 50 μm | 0 | 0 | 0 | 5 | 10 |
| Thickness: 100 u82 m | 0 | 0 | 0 | 0 | 2 |
| Thickness: 200 μm | 0 | 0 | 0 | 0 | 0 |

TABLE 2

|  | Comparative Example 1 | Comparative Example 2 | Comparative Example 3 | Comparative Example 4 |
|---|---|---|---|---|
| Viscosity: (P) | 400 | 350 | 390 | 37 |
| Flow properties: (mm) | 26 | 28 | 26 | 45 |
| Hardness (type A): | 45 | 42 | 45 | 32 |
| Tensile strength: (MPa) | 2.0 | 1.5 | 2.9 | 1.0 |
| Elongation: (%) | 100 | 100 | 110 | 130 |
| Volume resistivity: (TΩ.m) | 5 | 3 | 5 | 9 |
| Hardness after 250° C./24 hrs: | 48 | 50 | 50 | 56 |
| Adhesion: |  |  |  |  |
| to Ni | x | x | x | ○ |
| to Al | Δ | Δ | Δ | ○ |
| to Si | ○ | ○ | ○ | ○ |
| Light transmittance (800 nm): (%) |  |  |  |  |
| Thickness: 50 μm | 0 | 0 | 0 | 25 |
| Thickness: 100 μm | 0 | 0 | 0 | 10 |
| Thickness: 200 μm | 0 | 0 | 0 | 0 |

As described above, the composition of the present invention has a low viscosity and low thixotropic properties and easy to handle and also may cause less change with time, even though it contains titanium oxide in a large quantity. It also has a rich fluidity and hence has a superior operability when used as a light-screening agent or a reflecting agent, thus an improvement in properties of coated products and an improvement in reliability are expected.

What is claimed is:

1. A titanium oxide-filled addition reaction-curable silicone rubber composition comprising;

(A) a diorganopolysiloxane containing at least two alkenyl groups in one molecule;

(B) an organohydrogenpolysiloxane containing in one molecule at least two hydrogen atoms bonded to silicon atoms;

(C) a platinum group metal catalyst; and (D) a titanium oxide powder having been surface-treated with a compound selected from the group consisting of a tetraalkoxysilane and a partial hydrolysis-condensation product of a tetraalkoxysilane; the titanium oxide powder being contained in an amount not less than 15 parts by weight based on 100 parts by weight of the component (A).

2. The composition according to claim 1, wherein said diorganopolysiloxane of (A) is a diorganopolysiloxane represented by the following general formula (1):

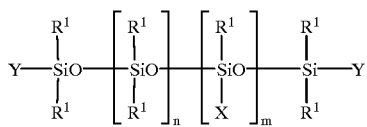
(1)

wherein $R^1$'s each independently represent a substituted or unsubstituted monovalent hydrocarbon group containing no aliphatic unsaturated bond, X represents an alkenyl group, Y's each represent an alkenyl group or a group represented by $R^1$, n is an integer of 0 or 1 or more, and m is an integer of 0 or 1 or more; having in the molecule at least two alkenyl groups bonded to silicon atoms.

3. The composition according to claim 2, wherein $R^1$'s in the general formula (1) are substituted or unsubstituted hydrocarbon groups having 1 to 10 carbon atoms.

4. The composition according to claim 2, wherein $R^1$'s in the general formula (1) are each a substituted or unsubstituted alkyl group having 1 to 3 carbon atoms or a substituted or unsubstituted phenyl group.

5. The composition according to claim 2, wherein X or X's in the general formula (1) are each an alkenyl group having 2 to 8 carbon atoms.

6. The composition according to claim 2, wherein X or X's in the general formula (1) are each a vinyl group or an allyl group.

7. The composition according to claim 2, wherein n and m in the general formula (1) are integers that satisfy $10 \leq n+m \leq 10,000$ and $0 \leq m/(m+n) \leq 0.2$.

8. The composition according to claim 1, wherein the alkenyl group-containing diorganopolysiloxane has a viscosity at 25° C. of from 1 to 100,000 poises.

9. The composition according to claim 1, wherein said organohydrogenpolysiloxane of the component (B) is represented by the average compositional formula (2):

$$H_a R^2_b SiO_{(4-a-b)/2} \quad (2)$$

wherein $R^2$ independently represents a substituted or unsubstituted monovalent hydrocarbon group containing no aliphatic unsaturated bond; and a and b are numbers that satisfy $0<a<2$, $0.7 \leq b \leq 2$ and $0.8 \leq a+b \leq 8$.

10. The composition according to claim 1, wherein said tetraalkoxysilane used for the component (D) is represented by the following general formula (7):

$$Si(OR^3)_4 \quad (7)$$

wherein $R^3$'s each independently represent a lower alkoxyl-substituted or unsubstituted alkyl group.

11. The composition according to claim 1, wherein said partial hydrolysis-condensation product of tetraalkoxysilane used for the component (D) is represented by the following average compositional formula (8):

$$[OR^3)_3SiO_{1/2}]_K[OR^3)_2SiO_{2/2}]_L[OR^3)SiO_{3/2}]_M[SiO_{4/2}]_N \quad (8)$$

wherein $R^3$ is as defined in claim 10; K, L, M and N are numbers that satisfy $K+L+M+N=1$, $0.002 \leq K \leq 1$, $0 \leq L \leq 0.998$, $0 \leq M \leq 0.998$ and $0 \leq N \leq 0.35$.

12. The composition according to claim 1, wherein said partial hydrolysis-condensation product of tetraalkoxysilane used for the component (D) is represented by the following general formula (9):

$$R^3O-[-Si(OR^3)_2O-]_j-R^3 \quad (9)$$

wherein $R^3$ is as defined in claim 10, and j is an integer of 2 or more.

13. The composition according to claim 1, wherein the titanium oxide powder to be surface-treated has an average particle diameter of from about 0.05 to 10 μm.

14. The composition according to claim 1, wherein the organohydrogenpolysiloxane of the component (B) is present in such an amount that hydrogen atoms bonded to silicon atoms in the component-(B) are present in an amount of from 0.5 to 8 moles per mole of the alkenyl group in the component-(A) alkenyl group-containing diorganopolysiloxane.

15. The composition according to claim 1, wherein the platinum group metal catalyst of the component (C) is present in an effective amount.

16. The composition according to claim 1, wherein the titanium oxide powder of the component (D) is present in an amount of 15 to 300 parts by weight based on 100 parts by weight of the component-(A) alkenyl group-containing diorganopolysiloxane.

17. A cured product obtained by curing the titanium oxide-filled addition reaction-curable silicone rubber composition as defined in claim 1.

* * * * *